US007651145B2

(12) United States Patent
Prokop et al.

(10) Patent No.: US 7,651,145 B2
(45) Date of Patent: Jan. 26, 2010

(54) INSTRUMENT PANEL

(75) Inventors: Jurgen Prokop, Landau (DE); Steve Kober, Treuen (DE); Marco Braun, Lug (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 37 days.

(21) Appl. No.: 11/912,750

(22) PCT Filed: May 30, 2006

(86) PCT No.: PCT/EP2006/062737

§ 371 (c)(1), (2), (4) Date: Dec. 21, 2007

(87) PCT Pub. No.: WO2006/131462

PCT Pub. Date: Dec. 14, 2006

(65) Prior Publication Data

US 2008/0156051 A1 Jul. 3, 2008

(30) Foreign Application Priority Data

Jun. 6, 2005 (DE) ....................... 10 2005 026 167

(51) Int. Cl.
*B60R 7/06* (2006.01)

(52) U.S. Cl. .................................................. 296/37.12

(58) Field of Classification Search ............... 296/37.12
See application file for complete search history.

(56) References Cited

U.S. PATENT DOCUMENTS 4,892,770 A * 1/1990 Labrie ......................... 428/71
5,001,308 A 3/1991 Mori
5,448,028 A 9/1995 Filtion et al.
5,952,630 A * 9/1999 Filion et al. ................. 200/5 R
6,371,548 B1 * 4/2002 Misaras ................... 296/146.7
6,483,048 B1 * 11/2002 Bontrager et al. ........... 200/5 R
6,698,262 B2 3/2004 Wittwer
2002/0101738 A1 8/2002 Misaras
2004/0066053 A1 * 4/2004 Fero .......................... 296/37.8

FOREIGN PATENT DOCUMENTS

DE 3440442 5/1986

(Continued)

OTHER PUBLICATIONS

International Preliminary Report on Patentability of International Application PCT/EP2006/062737 dated Jan. 24, 2008.

(Continued)

*Primary Examiner*—Dennis H Pedder
(74) *Attorney, Agent, or Firm*—Matthew B. Dernier, Esq.; Gibson & Dernier LLP

(57) ABSTRACT

A dashboard with a glove compartment cover is created according to the invention, in which the dashboard and the glove compartment cover have a surface skin and a foam layer underneath it, and one of the foam layers comprises a first recess. The dashboard furthermore comprises a locking mechanism for locking and unlocking the glove compartment cover and comprises a switch for actuating the locking mechanism. The dashboard is characterized in that the switch is arranged in the first recess of the foam layer under the surface skin.

14 Claims, 3 Drawing Sheets

FOREIGN PATENT DOCUMENTS

| | | | | |
|---|---|---|---|---|
| DE | 19617403 | A1 | | 11/1997 |
| DE | 19906049 | A1 | | 8/2000 |
| DE | 19922657 | | | 11/2000 |
| DE | 10015887 | | | 1/2002 |
| DE | 3533719 | A1 | | 9/2007 |
| EP | 0235552 | | * | 1/1987 |
| WO | 0208017 | A2 | | 1/2002 |

OTHER PUBLICATIONS

International Search Report of International Application PCT/EP2006/062737.

* cited by examiner

INSTRUMENT PANEL

BACKGROUND

The invention relates to a dashboard with a glove box cover and a switch for actuating a locking mechanism for locking and unlocking the glove compartment cover.

Mechanical actuating- and locking mechanisms are known from the practice in which a mechanical locking is usually arranged centrally on the glove compartment cover. The glove compartment can be unlocked and opened by pulling on a handle.

It has been shown that known glove compartment actuation devices have the disadvantage that the mechanical parts are especially sensitive to faulty manipulations and can be easily damaged when forced. Furthermore, such a mechanical locking must be arranged on the glove compartment itself and, depending on the position of the glove compartment, it is difficult for the driver to reach the actuation.

DE 199 06 049 A1 shows a locking apparatus of a glove compartment cover with a pushbutton. Such pushbutton switches have the disadvantage that they comprise sensitive movable mechanical parts and can not be optimally fitted into the design of a vehicle.

DE 199 22 657 discloses an apparatus for actuating an opening aid for closable parts in vehicles such as flaps, doors or the like with a manual actuator that acts when actuated on the contactor of a microswitch. The actuated microswitch actuates a drive for opening a closure of a flap or of a door. The actuator consists of an elastically yielding position of the rigidly designed body of the vehicle and the contactor of the microswitch is arranged in the yield path of this body position.

DE 100 15 887 describes an access system for a vehicle comprising at least one door, in which an identification system arranged on the vehicle reacts to an access authorization available outside of the vehicle.

DE 34 40 442 discloses a built-in pushbutton with a housing adapted to the thickness of the door leaf. The problem of the invention described in it is to create a pushbutton combined for the inside space and the outer space with a single contact. The invention described in DE 34 40 442 solves this problem in that two cup-shaped keying elements with a pressure spring between them are inserted into a cylindrical recess running vertically to the plane of the door, that an annular slot remains between the keying elements, and that an actuating element for a microswitch extends into the slot. The built-in pushbutton extends inward and outward beyond the door leaf plane. The projection of a built-in pushbutton is disadvantageous on the one hand because the pushbutton can be more readily damaged than a pushbutton that is integrated into the door leaf plane and on the other hand because the pushbutton impairs the optical appearance of the door by projecting out.

SUMMARY OF THE INVENTION

In contrast to the above, the invention is based on the problem of creating an improved dashboard that avoids the disadvantages of the known state of the art concerning the actuation of a locking mechanism.

According to the invention a dashboard with a glove compartment cover is created, which dashboard and glove compartment cover have a surface skin and a foam layer below it and one of the foam layers has a first recess. Furthermore, the dashboard comprises a locking mechanism for locking and unlocking the glove compartment cover and comprises a switch for actuating the locking mechanism. The dashboard is characterized in that the switch is arranged in the first recess of the foam layer under the surface skin. The positioning of the switch under the surface skin has the advantage that the switch is not visible from the outside, that is, from the vehicle cabin. The surface skin of the dashboard therefore does not have to be interrupted. It is sufficient to mark the position of the surface skin under which the switch is located, e.g., with a color or with an inscription. Since the switch can not be seen and given an appropriate design of the marking, an especially pleasing appearance of the surface skin can be achieved.

According to an embodiment of the invention the first recess is located in the foam layer of the dashboard.

Then, according to the invention a switch for unlocking or opening the glove compartment cover is provided that is arranged under a surface skin of the dashboard or of the glove compartment cover. Thus, the invention provides that a switch for a glove compartment cover is integrated in such a manner that that it is not absolutely visible from the outside, but rather the switch is integrated in the dashboard or in the glove compartment cover under a surface skin. “Surface skin” denotes any layer that closes the dashboard or the glove compartment cover in the sense of a surface facing the passengers, therefore, e.g., a decorative layer, an ornamental plate or a leather covering. According to the invention it is possible to integrate the switch at any desired position.

According to an embodiment of the invention the switch is located in the dashboard at a position accessible to the driver. The switch is preferably arranged in the dashboard that is also designated as the instrument panel. Thus, the switch can be arranged at any position, therefore, even on the driver’s side, which considerably facilitates its manipulation.

The switch is preferably arranged on the driver’s side, viewed from the middle of the glove compartment cover. That is, the switch does not have to be integrated in the glove compartment cover for opening the glove compartment, as is traditionally provided, but rather it can be arranged anywhere on the instrument panel in the direction of the driver. It is intended that the switch is arranged on the driver’s side of the vehicle. As a result, the driver does not have to stretch anymore when he would like to open the glove compartment.

According to an embodiment of the invention the first recess is located in the foam layer of the glove compartment cover. The switch can also be integrated in the foam layer of the glove compartment cover. Preferably, such a switch is only used to unlock the glove compartment cover since it is difficult to reach for the vehicle passengers when the glove compartment cover is open. However, the integration of the switch into the glove compartment cover has the advantage that in the case of a defective switch only the glove compartment cover has to be replaced, whereas in the case of an integration of the switch into the dashboard, in the case of a defective switch the entire dashboard might have to be replaced.

According to an embodiment of the invention the surface skins of the dashboard and of the glove compartment cover are designed to be flexible. The switch is located in the recess directly below the surface skin, to that it can be actuated on account of the flexibility of the surface skin.

According to an embodiment of the invention the dashboard and the glove compartment cover each has a carrier layer, the foam layer is located between the surface skin and the carrier layer, one of the carrier layers comprises a second recess and the second recess borders the first recess. If the switch is placed in the first recess of the foam layer of the dashboard, the second recess is located in the carrier layer of the dashboard directly behind the first recess. The switch can be partially present in the second recess or extend into the into the second recess. The use of a second recess behind the first recess had the advantage that a switch that is thicker than the foam layer can be used.

According to an embodiment of the invention the switch is fixed to an edge area of the carrier layer, which edge area surrounds the second recess. The carrier layer consists as a rule of a form-stable plastic such as, e.g., ABS. Therefore, the edge area of the carrier layer offers the optimal area for fixing the switch to the dashboard.

According to an embodiment of the invention the switch comprises barbs and the switch is fixed in the edge area of the carrier layer by introducing the barbs. The switch can be fixed in the carrier layer in an especially simple and economical manner by using barbs.

According to an embodiment of the invention the dashboard comprises cables that are used to transmit signals between the switch and the locking mechanism and that are conducted away from the switch through the second recess.

According to an embodiment of the invention the switch has a thickness of less than 1 mm, preferably less than 0.5 mm and especially preferably less than 0.25 mm.

According to an embodiment of the invention the switch is a membrane switch. In a preferred embodiment of the invention a membrane switch is used as switch. Such membrane switches preferably have a thickness of below 1 mm and are therefore especially easy to integrate in the instrument panel. Furthermore, such switches are economical to manufacture and are robust since they have few mechanically movable parts. Also, a membrane switch requires no expensive electronic components for its control.

According to an embodiment of the invention the switch comprises a pressure sensor. Alternatively, the invention provides the use of a pressure sensor. Such pressure sensors are even more insensitive to mechanical stress and can be integrated into an instrument panel in particular on account of their low overall height, e.g., as an integrally foamed-in structural component.

According to an embodiment of the invention the switch can be deactivated.

According to an embodiment of the invention the switch or the locking mechanism can be deactivated via the central locking of the vehicle.

This is particularly possible when the vehicle is standing. Thus, when the vehicle is parked the glove compartment is secured against unauthorized opening. The coupling of the actuation of the glove compartment with the locking apparatus of the vehicle is provided. However, it is also conceivable to couple the locking mechanism to further components of the vehicle. For example, it is provided that above a certain speed the unlocking of the glove compartment is released via the seat occupancy sensor in the passenger seat, that is usually present in any case in modern vehicles only when the passenger seat is occupied. This prevents the driver from being distracted by opening the glove compartment cover at high speeds.

According to an embodiment of the invention the switch is foamed into the first recess. Thus, the switch is designed as an integral component of the instrument panel. The foaming in has the advantage that it is especially economical and, in addition, foamed-in components have a high resistance to vibrations.

Alternatively, it is conceivable to clip the switch in the instrument panel. This has the advantage that the switch can be readily replaced individually in case of a defect.

According to a further development of the invention the glove compartment cover can be automatically opened and closed via the switch. Thus, e.g., the glove compartment can be opened and closed via an electric motor, which further improves the comfort of the vehicle.

BRIEF DESCRIPTION OF THE DRAWING

The invention is explained in detail in the following using an exemplary embodiment and FIG. 1 to FIG. 5.

DETAILED DESCRIPTION OF THE INVENTION

Figure 1:
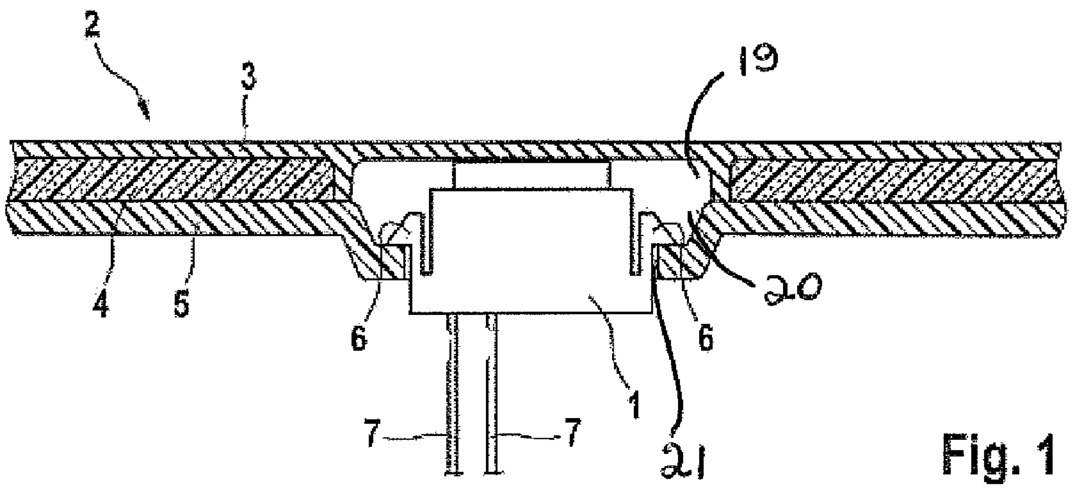
FIG. 1 shows a schematic view of a dashboard in accordance with the invention.

FIG. 1 shows a schematic view of a dashboard 2 in accordance with the invention. The dashboard 2 comprises a surface skin 3, a foam layer 4 and a carrier layer 5. Foam layer 4 is located between the surface skin and carrier layer 5. Foam layer 4 is interrupted by a first recess 19. Furthermore, carrier layer 5 is interrupted by a second recess 20. Dashboard 2 furthermore comprises a switch 1. Switch 1 is attached underneath surface skin 3 and first recess 19. It extends into second recess 20. Second recess 20 is limited by an edge area of carrier layer 5. Switch 1 has barbs 6 that are clipped into the relatively hard carrier layer, that can consist, e.g., of plastic. FIG. 1 also shows that carrier layer 5 may include an aperture 21 for receiving a portion of a switch therethrough. Furthermore, the switch comprises cables 7 used to transmit signals to a locking mechanism that is not shown in FIG. 1. It can be clearly recognized in FIG. 1 that switch 1 is arranged directly below surface skin 3. Surface skin 3 is designed to be flexible, so that switch 1 can be actuated by pressing in surface skin 3. Switch 1 is therefore not visible from the outside, that is, from the vehicle cabin. However, a marking can be applied on the outside of surface skin 3 that indicates the presence of the switch below the surface skin. The integration of the switch below the surface skin can achieve an especially pleasing appearance of the dashboard.

Figure 2:
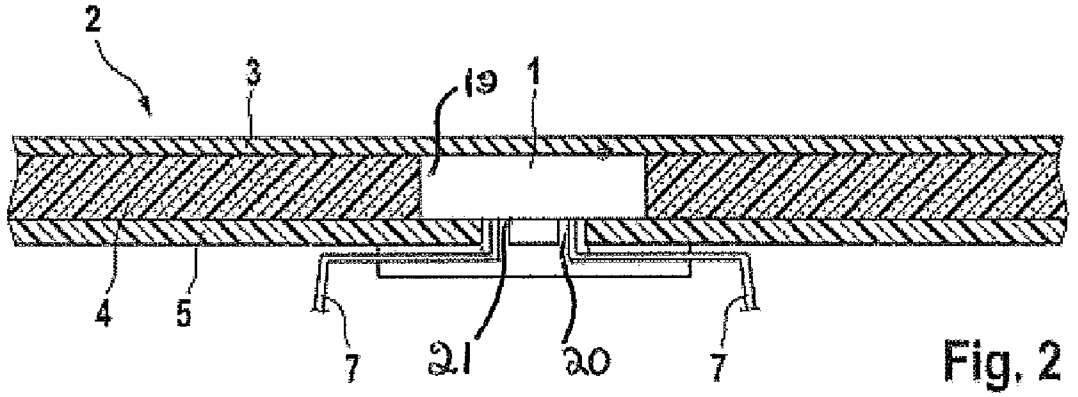
FIG. 2 shows a schematic view of a dashboard in accordance with the invention.

FIG. 2 shows an alternative embodiment of a dashboard 2 that can be seen in section. Dashboard 2 comprises surface skin 3, carrier layer 5 and foam layer 4 between them. Foam layer 4 is interrupted by recess 19 in which switch 1 is embedded. Furthermore, switch 1 comprises cables 7 guided by second recess 20 in carrier layer 5 away from the switch in the direction of the locking mechanism. In order to completely fill first recess 19 up with foam, recess 19 can still be filled in with foam after the switch has been installed. The foaming in of the switch into first recess 19 has the advantage that switch 1 is substantially fixed by the foam and by surface skin 3 and by carrier layer 5. No barbs are required for fixing the foam beater to the carrier layer.

Figure 3:
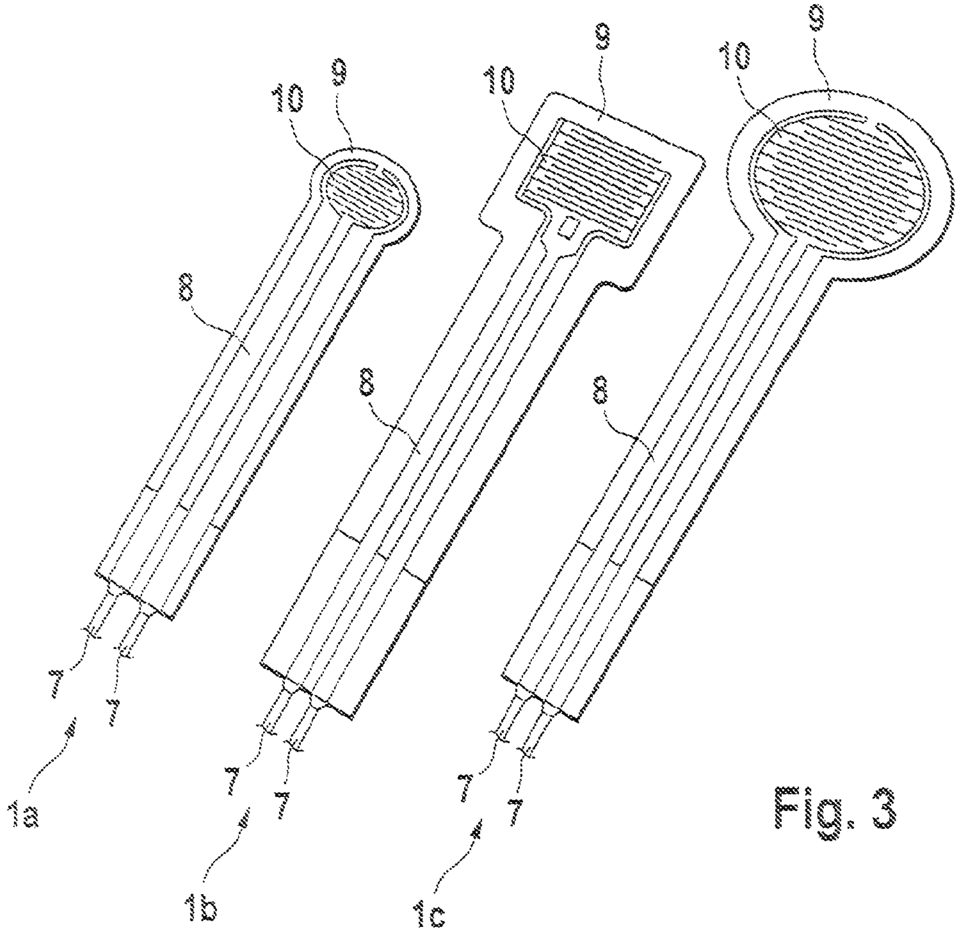
FIG. 3 shows a schematic view of pressure sensors in accordance with the invention.

FIG. 3 shows schematic detailed views of different pressure sensors 1*a*, 1*b*, 1*c*. Pressure sensors 1*a*, 1*b*, 1*c* comprise differently designed sensor plates 10 manufactured with thin-layer technology. Sensor plates 10 are connected via conducting tracks 8 to cables 7 via which switches 1*a*, 1*b*, 1*c* can be connected. Sensor plates 10 as well as conducting tracks 8 are imprinted or deposited on a substrate 9. Switch 1*c* has a larger round sensor plate in contrast to switch 1*a* and can therefore be actuated in a larger area. Switch 1*b* has a rectangular sensor plate 10.

Figure 4:
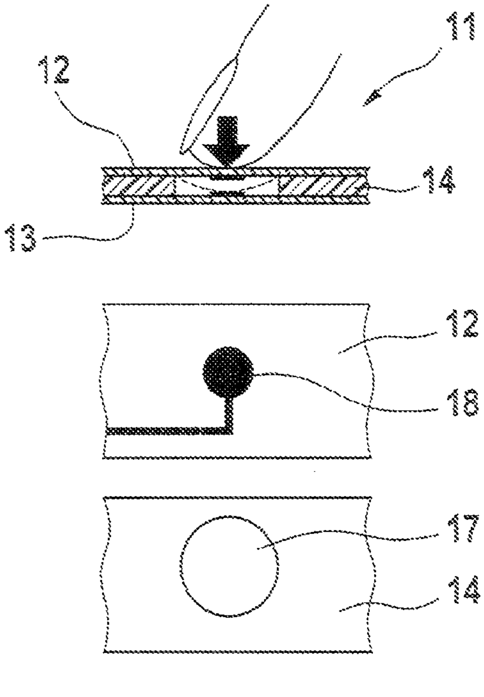
FIG. 4 shows a schematic detailed view of a membrane switch in accordance with the invention.

FIG. 4 schematically shows a membrane switch 11 in accordance with the invention. A membrane switch 11 comprises a cover foil 12, a lower foil 13 and an intermediate foil 14 arranged between them. Intermediate foil 14 that is shown once more below in detail has a recess 17. Cover foil 12 and lower foil 13 are each provided with a contact 18—shown in detail for intermediate foil 12. If pressure is exerted on membrane switch 11, the contacts of cover foil 12 and of lower foil 13 establish a connection. The foils consist in this exemplary embodiment of polyester on which the contacts are imprinted.

Figure 5:
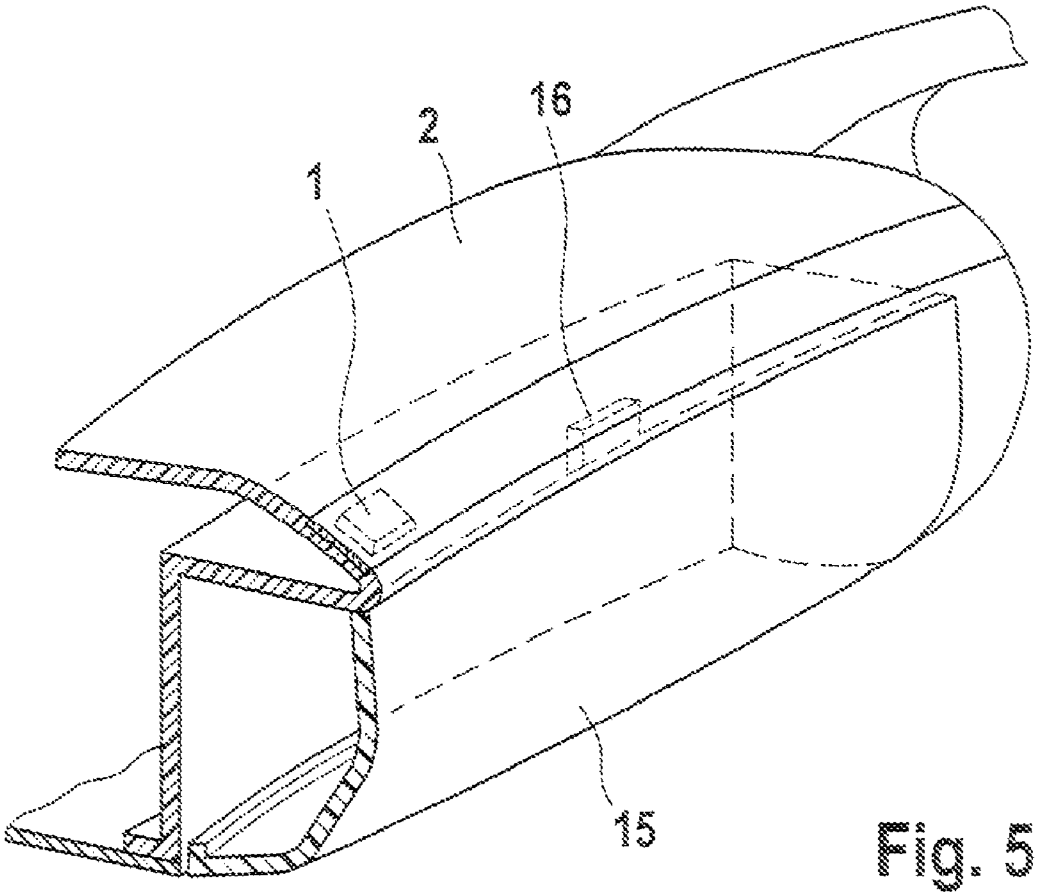
FIG. 5 shows a dashboard in accordance with the invention with a glove compartment.

FIG. 5 schematically shows a dashboard 2 with a glove compartment cover 15, a locking mechanism 16 for locking and unlocking glove compartment cover 15 and a switch 1 for actuating locking mechanism 16. Locking mechanism 16 can comprise, e.g., a piezo drive with which a bolt is drawn from a locking position into an unlocking position. Then, glove compartment cover 15 falls downward under the force of gravity, as a result of which the glove compartment opens. When the piezo drive is cut off, the bolt can then move back into the locking position under the traction force of a spring. Switch 1 serves to actuate the piezo mechanism and therewith to unlock the glove compartment cover. Switch 1 is located under the surface skin in the form of a decorative strip and cannot be seen from the front. A particularly simple and economical switch can be realized by using a membrane switch attached under the surface skin. Thus, the invention indicates a dashboard with a switch for actuating the locking mechanism that can be manufactured very favorably and on the other hand can be adapted very well into the design of the vehicle cabin as a result of its being placed under the surface.

Of course, the described exemplary embodiments are only by way of example and any logical combination of any features in accordance with the invention is provided.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE NUMERALS

1. switch
2 dashboard
3 surface skin
4 foam layer
5 carrier layer
6 barbs
7 cable
8 conducting track
9 foil
10 sensor plate
11 membrane switch
12 cover foil
13 lower foil
14 intermediate foil
15 glove compartment cover
16 locking mechanism
17 recess
18 contact
19 first recess
20 second recess

The invention claimed is:

1. An instrument panel, comprising:

a glove compartment cover, a surface skin, a foam layer including a first recess having an open end covered by the surface skin and an opposite, open end, a carrier layer supporting the foam layer opposite the surface skin, the carrier layer including: (i) a downward projection forming a second recess having an open end directed toward, and in communication with, the open end of the first recess, and an opposite end spaced away from the open end of the first recess, the first and second recesses defining a volume, and (ii) an aperture therethrough communicating with the volume, a locking mechanism for locking and unlocking the glove compartment cover, and a switch for actuating the locking mechanism, a first portion of the switch being disposed within the first recess, a second portion of the switch being disposed within the second recess, and a third portion of the switch extending through the aperture.

2. The instrument panel according to claim 1, wherein the surface skin is flexible.

3. The instrument panel according to claim 1, wherein the instrument panel and the glove compartment cover each have a carrier layer, the foam layer is located between the surface skin and the carrier layer, one of the carrier layers comprises the second recess and the second recess borders on the first recess.

4. The instrument panel according to claim 3, wherein the switch is fixed to an edge area of the carrier layer and the edge area surrounds the aperture.

5. The instrument panel according to claim 4, wherein the switch comprises barbs and the switch is fixed by placing the barbs in the edge area of the carrier layer.

6. The instrument panel according to claim 3, wherein the instrument panel also comprises cables, which cables are used to transmit signals between the switch and the locking mechanism, and in which the cables are guided away from the switch through the second recess.

7. The instrument panel according to claim 1, wherein the switch is a membrane switch.

8. The instrument panel according to claim 1, wherein the switch comprises a pressure sensor.

9. The instrument panel according to claim 1, wherein the switch has a thickness of one of: (i) less than 1 millimeter, (ii) less than 0.5 millimeter, and (iii) less than 0.25 millimeter.

10. The instrument panel according to claim 1, wherein the switch is foamed in the first recess.

11. The instrument panel according to claim 1, wherein the switch is arranged in the instrument panel at a location accessible for the driver.

12. The instrument panel according to claim 1, wherein the switch is attached in the recess directly below the surface skin and in which the switch can be activated by pressing the surface skin inward.

13. The instrument panel according to claim 1, wherein the carrier layer includes a first portion, a second portion transverse to the first portion, and a third portion transverse to the second portion thereby forming the second recess.

14. The instrument panel according to claim 1, wherein the first recess and the second recess form a volume substantially larger than either the first recess alone or the second recess alone.

* * * * *